(12) United States Patent
Hayashi et al.

(10) Patent No.: US 7,581,115 B2
(45) Date of Patent: Aug. 25, 2009

(54) INFORMATION PROCESSING METHOD, APPARATUS, AND INFORMATION PROCESSING PROGRAM

(75) Inventors: Junichi Hayashi, Kanagawa-ken (JP); Yuji Suga, Kanagawa-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 690 days.

(21) Appl. No.: 10/538,839

(22) PCT Filed: Jan. 23, 2004

(86) PCT No.: PCT/JP2004/000619

§ 371 (c)(1), (2), (4) Date: Jun. 13, 2005

(87) PCT Pub. No.: WO2004/066552

PCT Pub. Date: Aug. 5, 2004

(65) Prior Publication Data

US 2006/0069964 A1   Mar. 30, 2006

(30) Foreign Application Priority Data

Jan. 23, 2003   (JP) .............................. 2003-015233

(51) Int. Cl.
G06F 11/30 (2006.01)
G06F 12/14 (2006.01)
G08C 25/00 (2006.01)

(52) U.S. Cl. ......................... 713/189; 726/26; 714/758; 714/799

(58) Field of Classification Search .................... 726/26; 713/189

See application file for complete search history.

(56) References Cited

U.S. PATENT DOCUMENTS

| | | | | |
|---|---|---|---|---|
| 5,778,191 A * | 7/1998 | Levine et al. | ................ | 709/247 |
| 5,991,410 A | 11/1999 | Albert et al. | ................... | 380/24 |
| 6,047,069 A | 4/2000 | Hogan | ........................ | 380/268 |
| 6,434,253 B1 | 8/2002 | Hayashi et al. | ............. | 382/100 |
| 6,553,073 B1 * | 4/2003 | Ogata | ..................... | 375/240.28 |

(Continued)

FOREIGN PATENT DOCUMENTS

| | | |
|---|---|---|
| EP | 0 851 627 A1 | 7/1998 |
| JP | 6-120933 A | 4/1994 |
| JP | 2002-152180 A | 5/2002 |

OTHER PUBLICATIONS

"JPEG 2000 Part I Final Draft International Standard", Coding of Still Pictures, ISO IEC JTC 1/SC 29/WG1, pp. 1-224, Sep. 25, 2000.

(Continued)

*Primary Examiner*—William R Korzuch
*Assistant Examiner*—Sarah Su
(74) *Attorney, Agent, or Firm*—Fitzpatrick, Cella, Harper & Scinto

(57) ABSTRACT

Even when encoded (compressed) image data appended with an error-detecting code is encrypted, the apparatus which receives and reproduces that image data can execute a normal process without any insignificant re-send request and the like. To this end, encoded image data is input, and first error-detecting encoding information contained in its header is checked to determine whether or not an error-detecting code is appended. If it is determined that the error-detecting code is appended, the first error-detecting encoding information is changed to indicate the absence of an error-detecting code, and is saved as second error-detecting encoding information. Then, the encoded image data is encrypted.

6 Claims, 21 Drawing Sheets

U.S. PATENT DOCUMENTS

| | | | |
|---|---|---|---|
| 7,035,290 B1 * | 4/2006 | Lyle | 370/498 |
| 7,036,069 B2 * | 4/2006 | Rey et al. | 714/776 |
| 7,451,381 B2 * | 11/2008 | Miller et al. | 714/774 |
| 2003/0043749 A1 * | 3/2003 | Tanaka et al. | 370/241 |
| 2003/0066018 A1 * | 4/2003 | Yu et al. | 714/792 |
| 2003/0091054 A1 * | 5/2003 | Futenma et al. | 370/395.42 |
| 2003/0190042 A1 | 10/2003 | Tagashira et al. | 380/45 |
| 2003/0237040 A1 * | 12/2003 | Lin | 714/776 |
| 2004/0141613 A1 | 7/2004 | Hayashi | 380/28 |
| 2004/0202323 A1 * | 10/2004 | Fellerer | 380/44 |
| 2006/0015514 A1 | 1/2006 | Suga | 707/100 |
| 2007/0074091 A1 * | 3/2007 | Go et al. | 714/752 |

OTHER PUBLICATIONS

Schäfer, G., "Security in Fixed and Wireless Networks", Chapter 11, "IPSec Security Architecture", pp. 195-225 and 231-235 (John Wiley & Sons, Inc., UK) (2003).

R. Temple and J. Regnault, Eds., "Internet and Wireless Security" pp. 190-194 (BTexact Technologies, UK) (2002).

* cited by examiner

INFORMATION PROCESSING METHOD, APPARATUS, AND INFORMATION PROCESSING PROGRAM

TECHNICAL FIELD

The present invention relates to a technique and the like for encrypting encoded (compressed) digital image data.

BACKGROUND ART

Conventionally, in order to transmit image data or the like in secret, the entire image data undergoes encryption, scrambling, or the like. Such techniques are used to encrypt all or some components of image data in advance using an encryption key, and allow only a person or device which has a decryption key corresponding to the encryption key to normally decrypt the encrypted image data.

On the other hand, since image data has a large information size, encoding (compression) is normally done to efficiently transmit and store such image data. As encoding (compression) techniques, a technique called JPEG2000 standardized by, e.g., ISO IEC JTC 1/SC 29/WG1 and the like are promising. Therefore, it is desired to apply the aforementioned encryption process of image data to image data encoded (compressed) by, e.g., JPEG2000.

In JPEG2000, even when any error has occurred during a transmission process, a function of detecting such error can be used. Since the transmitting side encodes (compresses) image data using this function upon transmission, even when the receiving side detects any error during decoding (decompression), it can normally decode (decompress) the image data by sending a re-send request that requests the transmitting side to re-transmit only data of such errored part and decoding (decompressing) the re-transmitted data.

However, as described above, when image data is encoded (compressed) to allow error-detecting, and the encoded (compressed) image data further undergoes the encryption process, the error-detecting function often does not work normally. This is because the receiving side determines the encrypted image data as image data that has caused an error (as a wrong determination result). In such case, even when the re-send request of a part, which is determined to have an error, is transmitted to the transmitting side, the transmitting side which knows that the part is normal transmits the same image data (as the part determined to have an error), as a matter of course. In some cases, the re-send request may be repeated.

DISCLOSURE OF INVENTION

The present invention has been made in consideration of the above problems, and has as its object to provide a technique that allows, even when encoded image data appended with an error-detecting code is encrypted, an apparatus which receives and reproduces such data to execute a normal process without any insignificant re-send request or the like. In order to achieve this object, for example, an information processing method of the present invention comprises the following steps.

Other features and advantages of the present invention will be apparent from the following description taken in conjunction with the accompanying drawings, in which like reference characters designate the same or similar parts throughout the figures thereof.

BEST MODE FOR CARRYING OUT THE INVENTION

Preferred embodiments of the present invention will be described hereinafter with reference to the accompanying drawings.

<Description of Overall Arrangement>

Figure 9:
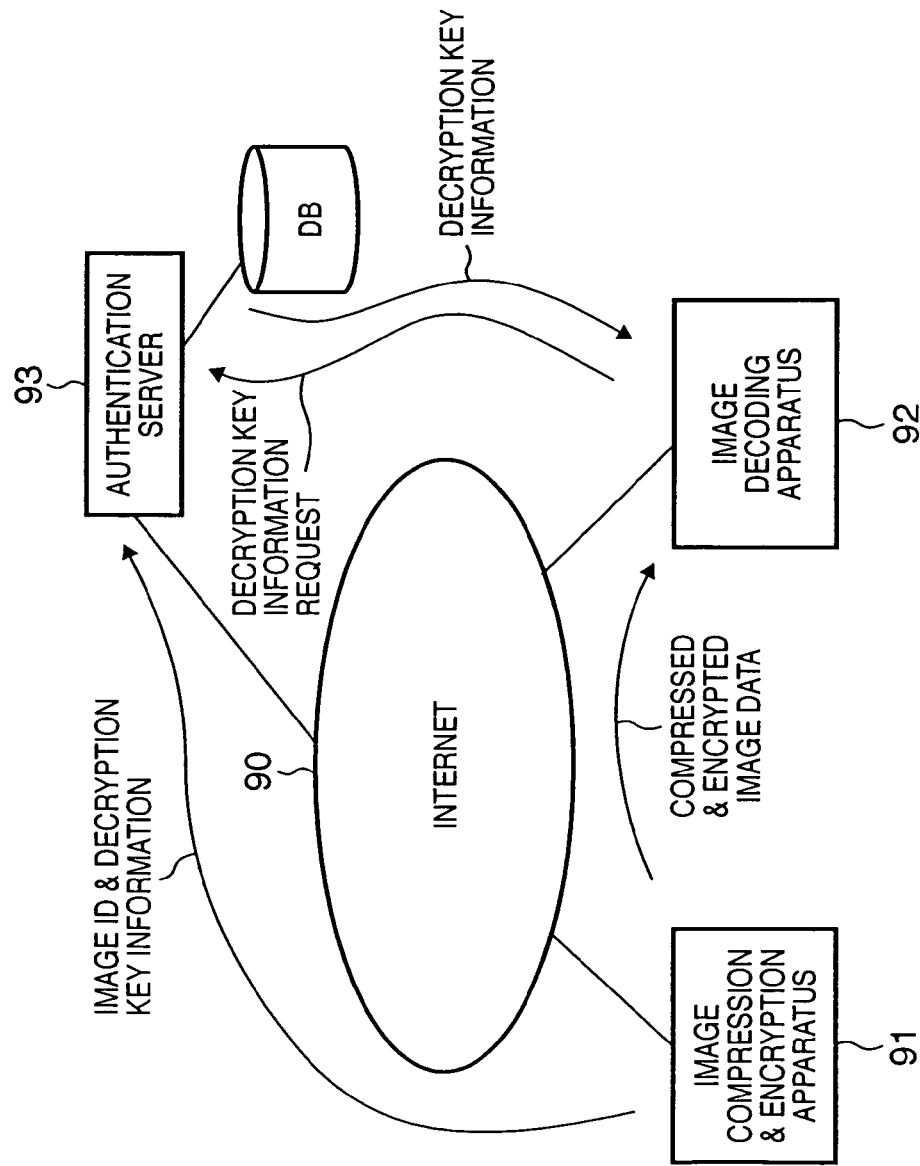
FIG. 9 is a block diagram showing the arrangement of the overall system in the embodiment.

FIG. 9 shows an example of a system overview in this embodiment. Referring to FIG. 9, reference numeral 90 denotes the Internet; and 91, an apparatus for executing an encoding (compression) & encryption process of image data sensed by a digital camera, image scanner, film scanner, or the like. Reference numeral 92 denotes an apparatus which receives image data and decodes (decompresses) and decrypts the received image data; and 93, an authentication server which stores a decryption key required upon decrypting the image data. The apparatuses 91 to 93 can be versatile apparatuses such as personal computers and the like. The flow of the process will be briefly described below.

The apparatus 91 executes an encoding (compression) & encryption process of desired image data, and distributes the processed image data via the Internet 90. The apparatus 91 may distribute the image data directly or via an appropriate server. In this case, since the image data is encrypted, key information required to decrypt that encrypted image data is registered in a DB of the authentication server 93 together with information (e.g., an ID) used to specify that image data. The image decode (decompress)/decrypt apparatus 92 is used to receive a desired image, decode (decompress)/decrypt that image, and browse the decrypted image. In order to browse encrypted image data, the apparatus 92 sends information used to specify that image to the authentication server 93 and requests the server 93 to send decryption key information. As a result since the authentication server 93 transmits the decryption key information, the apparatus 92 decrypts the encrypted image data using that key information, and then decodes (decompresses) the encoded image data.

<Encoding (Compression) Processor>

The encoding (compression) process in the encoding (compression) & encryption apparatus 91, and an error-detecting encoding function executed during the former process will be explained first using FIG. 1.

Figure 1:
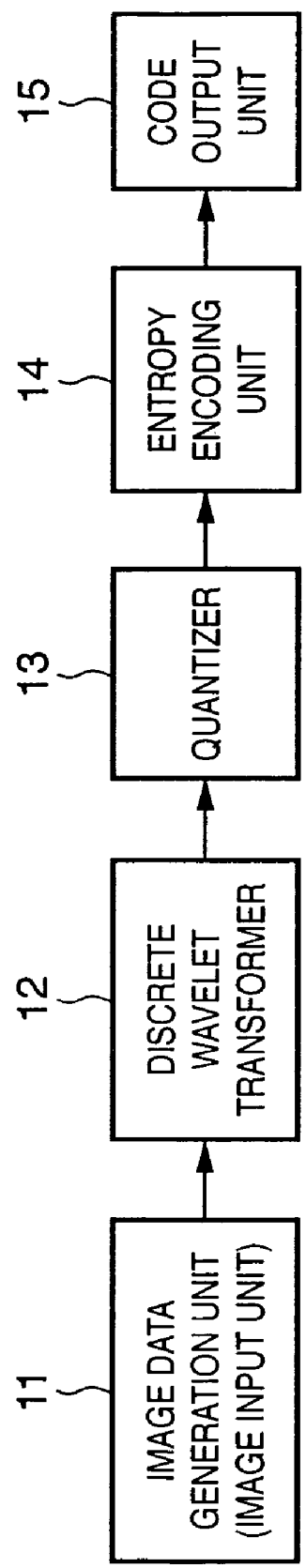
FIG. 1 is a block diagram showing the arrangement of an encoding (compression) processor in an embodiment of the present invention.

Referring to FIG. 1, reference numeral 11 denotes an image input unit; 12, a discrete wavelet transformer; 13, a quantizer; 14, an entropy encoding (compression) unit; and 15, a code output unit. The image input unit 11 receives pixel signals that form an image to be encoded (compressed) in the raster scan order, and its output is supplied to the discrete wavelet transformer 12. In the following description, an image signal represents a monochrome multi-valued image. However, when a plurality of color components of, e.g., a color image or the like are to be encoded (compressed), each of R, G, and B color components or each of luminance and chromaticity components may be encoded (compressed) as the monochrome component.

Figure 2A:
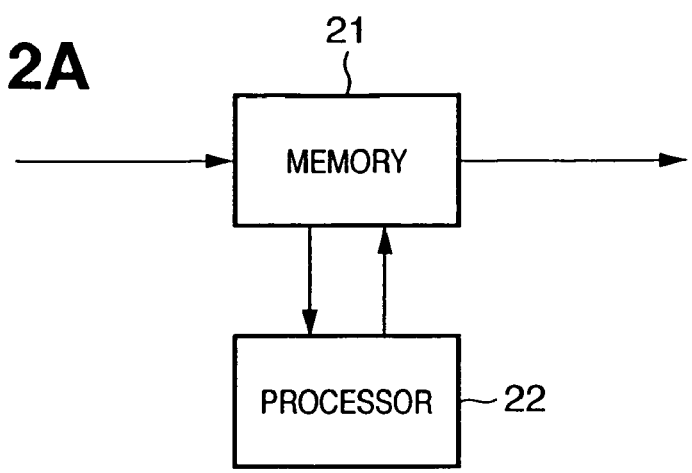
FIGS. 2A to 2C are views for explaining a discrete wavelet transformer in the embodiment.
Figure 2B:
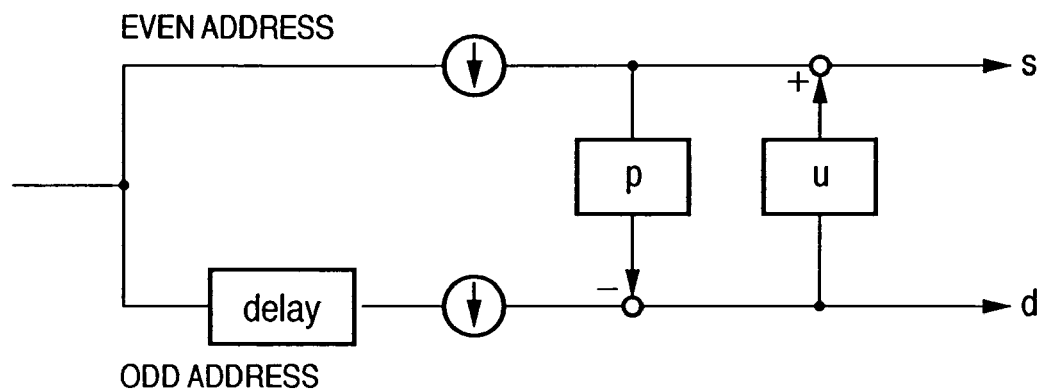

The discrete wavelet transformer 12 executes a two-dimensional (2D) wavelet transformation process for the input image signal, and computes and outputs transformation coefficients. FIG. 2A shows the basic arrangement of the discrete wavelet transformer 12. An input image signal is stored in a memory 21, is sequentially read out by a processor 22 to undergo the transformation process, and is written in the memory 21 again. In this embodiment, FIG. 2B shows the arrangement of processes in the processor 22. Referring to FIG. 2B, an input image signal is separated into odd and even address signals by a combination of a delay element and down samplers. That is, the input pixel data are separated into even- and odd-numbered pixels. The separated pixel data undergo filter processes of two filters p and u. In FIG. 2B, s and d represent low- and high-pass coefficients upon decomposing a linear image signal to one level, and are respectively computed by:

$$d(n)=x(2*n+1)-\text{floor}((x(2*n)+x(2*n+2))/2) \quad (1)$$

$$s(n)=x(2*n)+\text{floor}((d(n-1)+d(n))/4) \quad (2)$$

where x(n) is an image signal to be transformed.

Figure 2C:
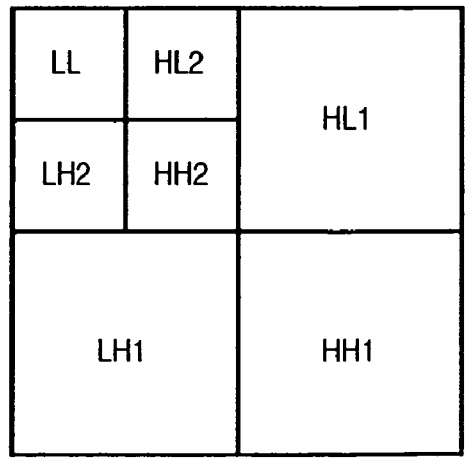

With the aforementioned process, a linear discrete wavelet transformation process is done for the image signal. Two-dimensional discrete wavelet transformation is implemented by sequentially executing linear transformation in the horizontal and vertical directions of an image. Since details of this process are known to those who are skilled in the art, a description thereof will be omitted. FIG. 2C shows a configuration example of transformation coefficient groups of two levels (meaning the number of times of wavelet transformation is "2") obtained by the 2D transformation process. An image signal is decomposed into different frequency bands HH1, HL1, LH1, . . . , and LL. Note that these frequency bands will be referred to as subbands hereinafter. The coefficients which respectively form the subbands are output to the quantizer 13.

The quantizer 13 quantizes the input coefficients by a predetermined quantization step, and outputs indices corresponding to the quantized values. In this case, quantization is described by:

$$q=\text{sign}(c)\,\text{floor}(abs(c)/\Delta) \quad (3)$$

$$\text{sign}(c)=1; c>0 \quad (4)$$

$$\text{sign}(c)=-1; c<0 \quad (5)$$

where c is a coefficient to be quantized. In this embodiment, the value $\Delta$ includes "1". When $\Delta=1$, no quantization is done in practice, and transformation coefficients input to the quantizer 13 are directly output to the entropy encoding unit 14.

Figure 3:
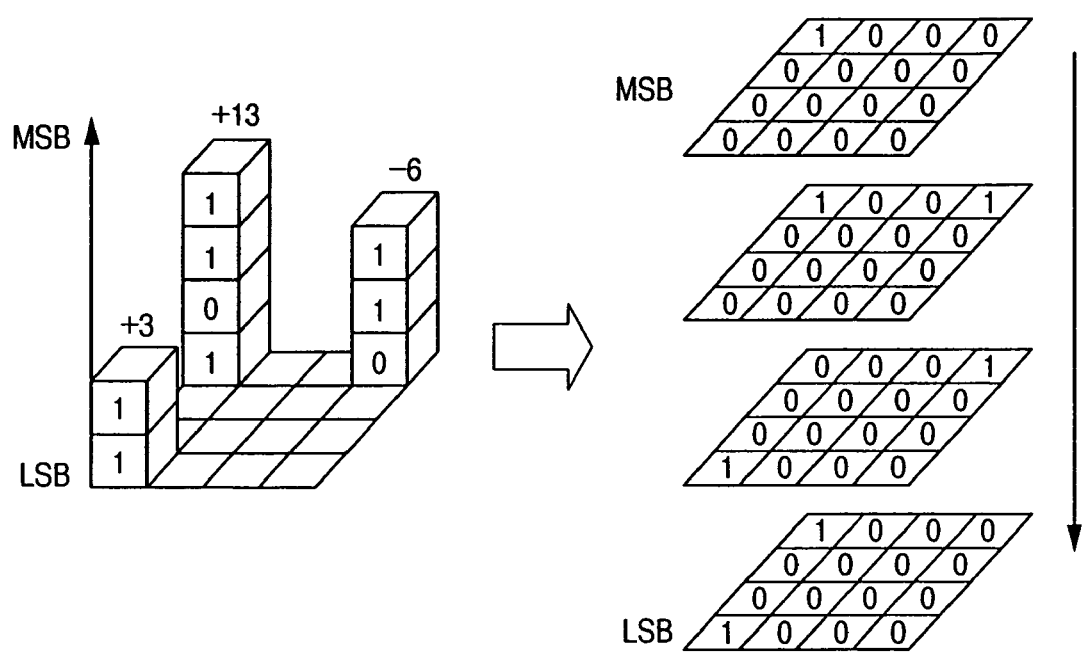
FIG. 3 is a view for explaining entropy encoding in the embodiment.

The entropy encoding unit 14 decomposes the input quantization indices into bit planes, executes binary arithmetic encoding for respective bit planes, and outputs a code stream. FIG. 3 is a view for explaining the operation of the entropy encoding unit 14. In this example, a region in a subband having a 4×4 size includes three nonzero quantization indices, which respectively have values "+13", "−6", and "+3". The entropy encoding unit 14 scans this region to obtain a maximum value M, and computes the number S of bits required to express the maximum quantization index by:

$$S=\text{ceil}(\log 2(abs(M))) \quad (6)$$

where ceil(x) is the smallest one of integers equal to or larger than x.

In FIG. 3, since the maximum coefficient value is "13", S=4. Hence, 16 quantization indices in the sequence are processed for respective four bit planes, as shown in FIG. 3. The entropy encoding unit 14 makes entropy encoding (binary arithmetic encoding in this embodiment) of bits of the most significant bit plane (indicated by MSB in FIG. 3) first, and outputs the encoding result as a bitstream. Then, the encoding unit 14 lowers the bit plane by one level, and encodes and outputs bits in each bit plane to the code output unit 15 until the bit plane of interest reaches the least significant bit plane (indicated by LSB in FIG. 3). In the entropy encoding, as for the sign of each quantization index, when a nonzero bit to be encoded first (most significantly) is detected upon scanning from the upper to lower bit planes, one bit indicating the sign of the quantization index of interest undergoes binary arithmetic encoding immediately after the nonzero bit. In this manner, the sign of a nonzero quantization index can be efficiently encoded.

Figure 10:
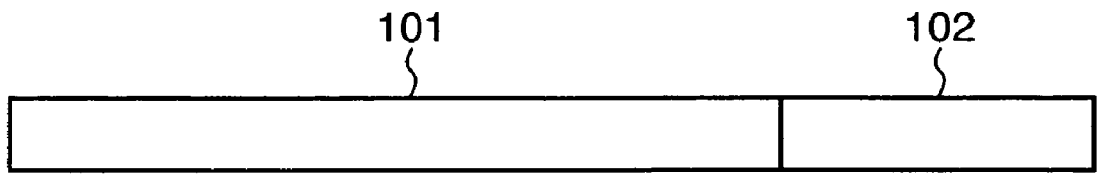
FIG. 10 shows a structure of data appended with an error-detecting code in the embodiment.

Error-detecting encoding to be applied to this embodiment will be described below using FIG. 10. Referring to FIG. 10, reference numeral 101 denotes a sequence of bits in one bit plane mentioned above. Reference numeral 102 denotes predetermined information to be appended after the sequence 101 for error-detecting encoding. This predetermined information will be referred to as a segmentation symbol hereinafter. Error-detecting encoding of this embodiment is implemented by entropy-encoding entire information formed by appending the segmentation symbol (102) after the original information (101) which is to be entropy-encoded, as shown in FIG. 10. Note that the encoding (compression) processor and a decoding (decompression) processor (to be described later) use the same value as the segmentation symbol.

Figure 4:
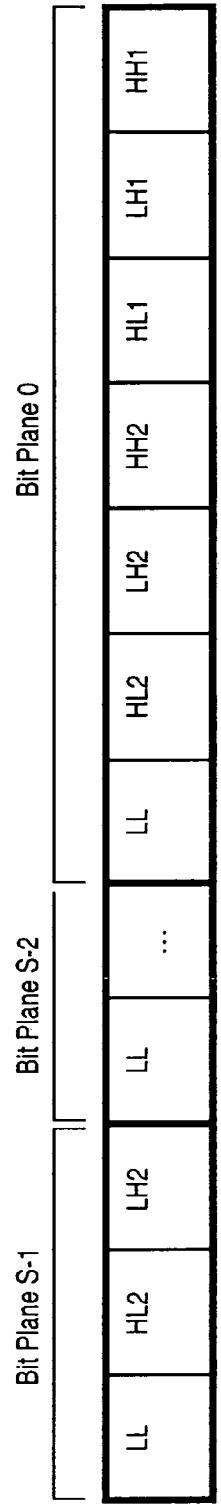
FIGS. 4A to 4D are views for explaining a code stream in the embodiment.

FIGS. 4A to 4D show the configuration of the code stream which is generated and output in this way. FIG. 4A shows the overall configuration of the code stream, in which MH is a main header; TH, a tile header; and BS, a bitstream. As shown in FIG. 4B, main header MH is comprised of the size (the numbers of pixels in the horizontal and vertical directions) of an image to be encoded, the size of each tile upon breaking up the image into tiles as a plurality of rectangular regions, the number of components indicating the number of color components, the size of each component, and component information indicating bit precision. In this embodiment, since the image is not segmented into tiles, the tile size and image size assume the same value, and the number of components is 1 when an image to be encoded is a monochrome multi-valued image.

FIG. 4C shows the configuration of tile header TH. Tile header TH consists of a tile length including the bitstream length and header length of the tile of interest, and an encoding parameter for the tile of interest. The encoding parameter includes a discrete wavelet transformation level, filter type, and the like. Furthermore, the encoding parameter includes information indicating whether or not error-detecting encoding is applied. This information (which can be 1 bit) indicating whether or not error-detecting encoding is applied will be referred to as "first error-detecting encoding information" hereinafter. When the first error-detecting encoding information is "0", it indicates that no error-detecting encoding is applied; when the first error-detecting encoding information is "1", it indicates that error-detecting encoding is applied.

FIG. 4D shows the configuration of the bitstream in this embodiment. In FIG. 4D, a bitstream is formed for respective subbands, which are arranged in turn from a subband having a low resolution in ascending order of resolution. Furthermore, in each subband, codes are set for respective bit planes, i.e., in the order from an upper bit plane to a lower bit plane.

Figure 8A:
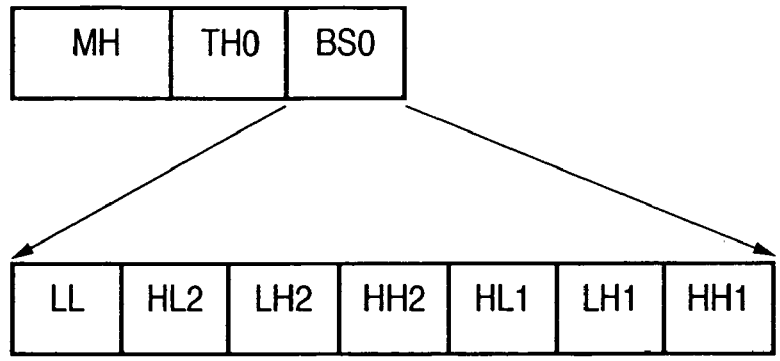
FIGS. 8A and 8B are views for explaining hierarchical decoding (decompression) in the embodiment.
Figure 8B:
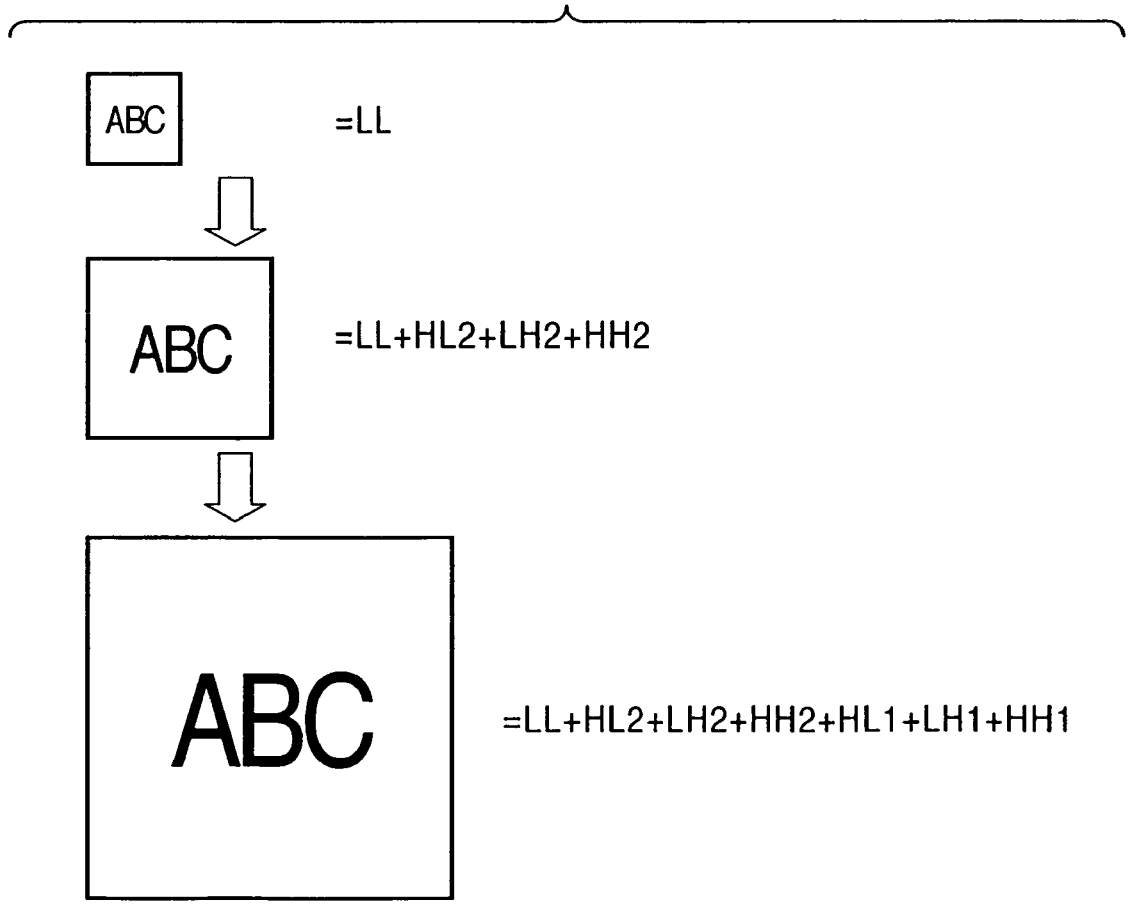

With the above code sequence, a code stream shown in FIG. 8A (to be described later) can be generated, and hierarchical decoding (decompression) shown in FIG. 8B can be made.

In this embodiment, the compression ratio of the entire image to be encoded (compressed) can be controlled by changing the quantization step $\Delta$.

As another method, in this embodiment, the lower bits of a bit plane to be encoded by the entropy encoding unit 14 may be limited (discarded) in correspondence with a required compression ratio. In such case, not all bit planes are encoded, but bit planes from the most significant bit plane to a bit plane corresponding in number to the required compression ratio are encoded, and are contained in a final code stream.

<Decoding (Decompression) Processor>

Figure 5:
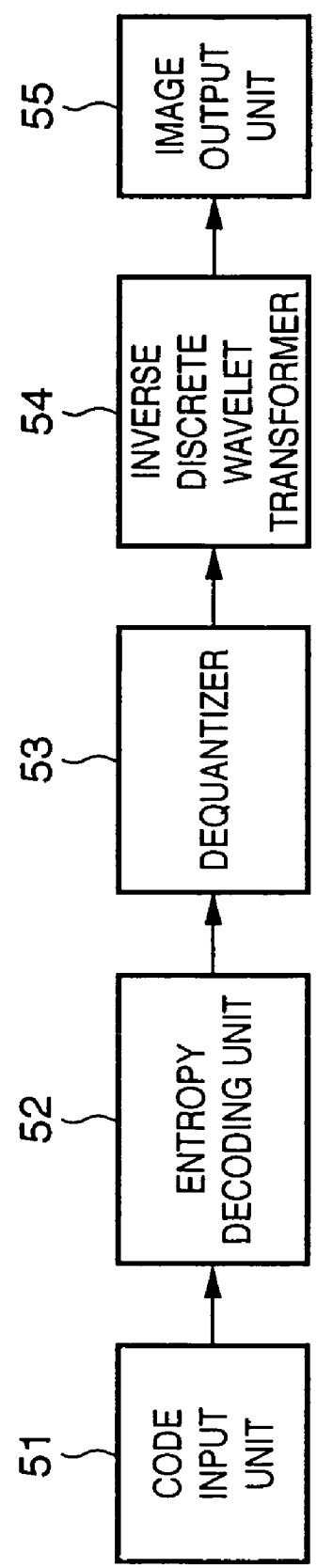
FIG. 5 is a block diagram showing the arrangement of a decoding (decompression) processor in the embodiment.

A method of decoding (decompressing) a code stream generated by the aforementioned encoding (compression) processor, and error-detecting function will be described below. FIG. 5 is a block diagram showing the arrangement of the decoding (decompression) processor. In FIG. 5, reference numeral 51 denotes a code input unit; 52, an entropy decoding (decompression) unit; 53, a dequantizer; 54, an inverse discrete wavelet transformer; and 55, an image output unit.

The code input unit 51 receives a code stream, analyzes the header included in that code stream to extract parameters required for the subsequent processes, and controls the flow of processes if necessary or outputs required parameters to the subsequent processing units. The bitstream included in the code stream is output to the entropy decoding (decompression) unit 52.

Figure 6:
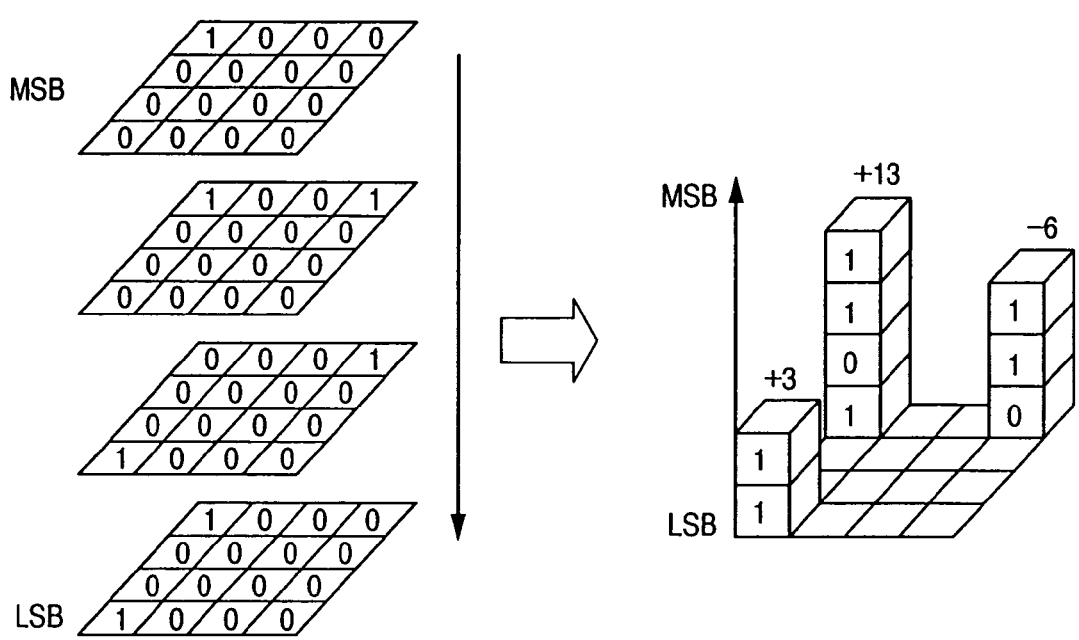
FIG. 6 is a view for explaining entropy decoding (decompression) in the embodiment.

The entropy decoding (decompression) unit 52 decodes (decompresses) and outputs the bitstream for respective bit planes. The decoding sequence at that time is as shown in FIG. 6. FIG. 6 shows the flow of the process for sequentially decoding (decompressing) a given region of a subband to be decoded (decompressed) for respective bit planes (in case of four planes), and finally restoring quantization indices. The bit planes are decoded (decompressed) in the order of an arrow in FIG. 6. The restored quantization indices are output to the dequantizer 53.

The error-detecting function of this embodiment will be described below. Whether or not data has been error-detecting encoded can be determined by analyzing the header contained in the input code stream, and checking first error-detecting encoding information contained in the encoding parameter in the header. When the first error-detecting encoding information is "1" (it is determined that the code stream has been error-detecting encoded), whether or not the appended segmentation symbol (102 in FIG. 10) of the entropy-decoded (decompressed) bit planes matches that appended by the aforementioned encoding processor is checked. When these segmentation symbols match, it is determined that no error has occurred; otherwise, it is determined that an error has occurred. If an error has occurred, the code stream can be normally decoded (decompressed) by transmitting a re-send request of the corresponding bit plane to the transmitting side.

The dequantizer 53 reclaims discrete wavelet transformation coefficients from the input quantization indices by:

$$c'=\Delta*q; \quad q\neq 0 \tag{7}$$

$$c'=0; \quad q=0 \tag{8}$$

where q is the quantization index, $\Delta$ is the quantization step, which is the same value used upon encoding, and c' is the restored transformation coefficient, which is obtained by restoring a coefficient s or d in encoding. The transformation coefficient c' is output to the inverse discrete wavelet transformer 54.

Figure 7A:
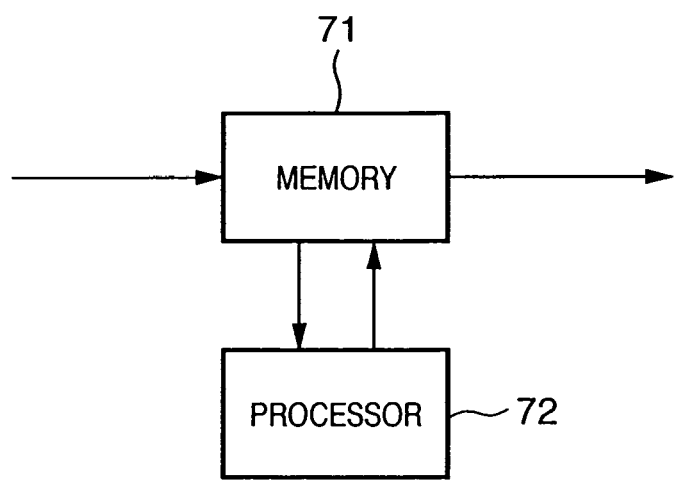
FIGS. 7A and 7B are block diagrams for explaining an inverse discrete wavelet transformer in the embodiment.
Figure 7B:
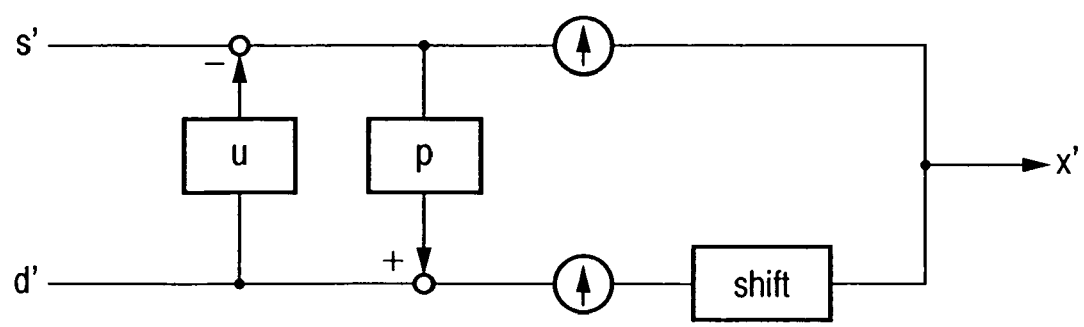

FIGS. 7A and 7B are block diagrams showing the arrangement and processes of the inverse discrete wavelet transformer 54. In FIG. 7A, the input transformation coefficients are stored in a memory 71. A processor 72 executes linear inverse discrete wavelet transformation, and implements 2D inverse discrete wavelet transformation by sequentially reading out the transformation coefficients from the memory 71. The 2D inverse discrete wavelet transformation is executed in a sequence opposite to the forward transformation, but since its details are known to those who are skilled in the art, a description thereof will be omitted. FIG. 7B shows processing blocks of the processor 72. The input transformation coefficients undergo two filter processes of filters u and p. The processed transformation coefficients are added after up-sampling, thus outputting an image signal x'. These processes are described by:

$$x'(2*n)=s'(n)-\text{floor}((d'(n-1)+d'(n))/4) \tag{9}$$

$$x'(2*n+1)=d'(n)+\text{floor}((x'(2*n)+x'(2*n+2))/2) \tag{10}$$

Note that the forward and inverse discrete wavelet transformation processes given by equations (1), (2), (9), and (10) satisfy a perfect reconstruction condition. Hence, since the quantization step $\Delta=1$ in this embodiment, the restored image signal x' matches an original image signal x if all bit planes are decoded (decompressed) in bit plane decoding (decompression).

With the aforementioned process, an image signal is reclaimed and is output to the image output unit 55. The image output unit 55 may be an image display device such as a monitor or the like, or may be a storage device such as a magnetic disk or the like.

The image display pattern upon restoring and displaying an image in the aforementioned sequence will be explained using FIGS. 8A and 8B. FIG. 8A shows an example of a code stream, the basic configuration of which is based on FIGS. 4A to 4D, but the entire image is set as a tile. Therefore, the code stream contains only one tile header and bitstream. In bitstream BS, codes are set in turn from LL as a subband corresponding to the lowest resolution in ascending order of resolution, as shown in FIG. 8A.

The decoding (decompression) processor sequentially reads this bitstream, and displays an image upon completion of decoding (decompression) of codes corresponding to each subband. FIG. 8B shows correspondence between respective subbands, and the sizes of images to be displayed. In this example, two levels of 2D discrete wavelet transformation processes are done, and when LL alone is decoded (decompressed) and displayed, an image, the numbers of pixels of which are reduced to ¼ in the horizontal and vertical directions with respect to the original image, is restored. When bitstreams are further read and all subbands of level 2 are decoded (decompressed) and displayed, an image, the numbers of pixels of which are reduced to ½ in the horizontal and vertical directions, is restored. Also, when all subbands of level 1 are decoded (decompressed), an image having the same number of pixels as that of the original image is restored.

In the aforementioned embodiment, when the entropy decoding (decompression) unit 52 limits (ignores) lower bit planes to be decoded (decompressed), the encoded data size to be received or processed is reduced, and the compression ratio can be consequently controlled. In this manner, a decoded image with required image quality can be obtained from only encoded data of the required data size. When the quantization step Δ upon encoding is "1", and all bit planes are decoded (decompressed) upon decoding (decompression), lossless encoding/decoding that allows a decoded image to match with an original image can be implemented.

<Encryption Processor>

An encryption processor that can be applied to this embodiment will be described below using FIG. 11.

Figure 11:
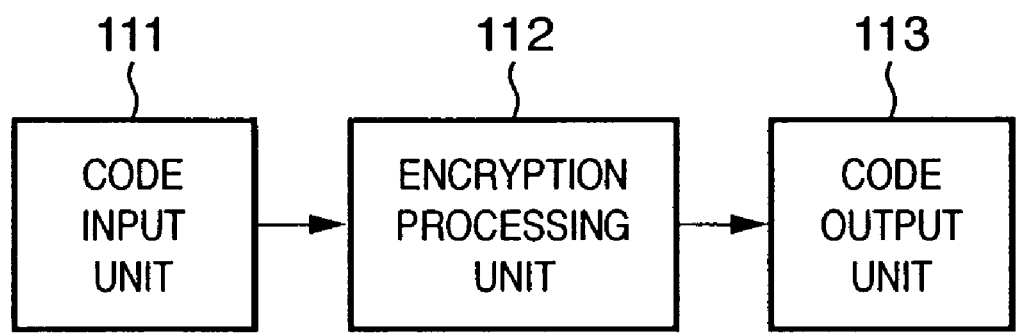
FIG. 11 is a block diagram showing the arrangement of an encryption processor in the first embodiment.

Referring to FIG. 11, reference numeral 111 denotes a code input unit; 112, an encryption processing unit; and 113, a code output unit. In FIG. 11, assume, for the sake of easy understanding, that the code input unit 111 receives the output result of the code output unit 15 in FIG. 1.

The code input unit 111 receives a code stream, analyzes the header included in that code stream to extract parameters required for the subsequent processes, and outputs required parameters to the subsequent processing units. The bitstream contained in the code stream is output to the encryption processing unit 112.

The encryption processing unit 112 receives the bitstream, encrypts the bitstream in accordance with information (stored in, e.g., a hard disk), which is designated by the operator or set in advance, and outputs the encrypted bitstream.

Figure 12:
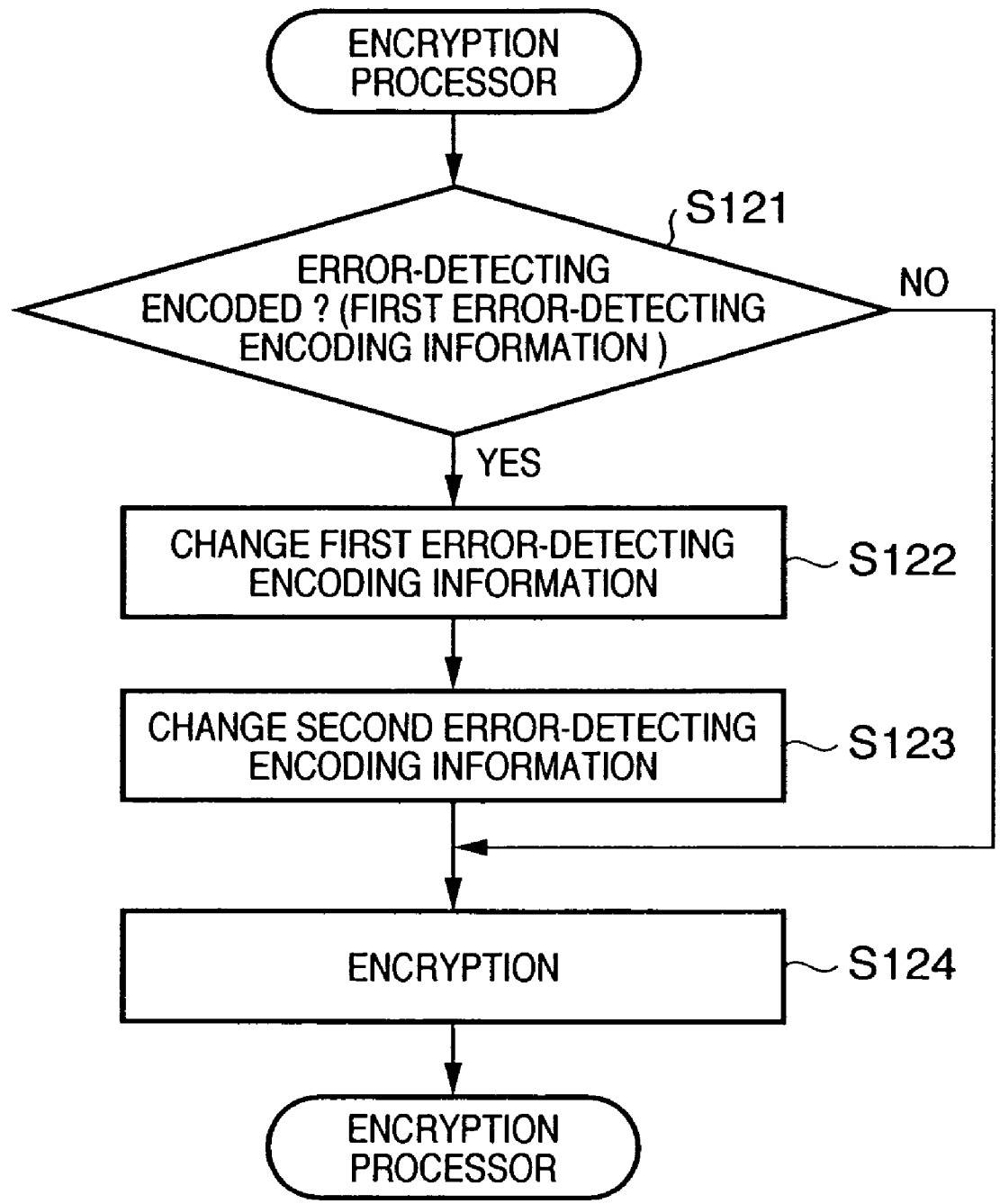
FIG. 12 is a flow chart showing an encryption process sequence in the first embodiment.

The encryption process executed by the encryption processing unit 112 will be described below using FIG. 12. FIG. 12 is a flow chart showing the encryption process that can be applied to this embodiment.

It is checked in step S121 if the input bitstream has been error-detecting encoded. This checking process can be attained using the first error-detecting encoding information contained in the encoding parameter, which is analyzed by the code input unit 111. If the first error-detecting encoding information is "1" (it is determined that the bitstream has been error-detecting encoded), the flow advances to step S122; if the first error-detecting encoding information is "0" (it is determined that the bitstream has not been error-detecting encoded), the flow jumps to step S124.

In step S122, the first error-detecting encoding information is changed to "0". That is, the first error-detecting encoding information is changed to indicate that "no error-detecting encoding is applied". This is to prevent the error-detecting function of the decoding (decompression) processor from erroneously determining that "an error has occurred" in the encryption process in step S124 (to be described later). Since the first error-detecting encoding information is set to be "0", the error-detecting function of the decoding (decompression) processor is disabled, but erroneously determining that "an error has occurred" can be prevented. After step S122, the flow advances to step S123.

In step S123, second error-detecting encoding information, which is different from the first error-detecting encoding information, is set to be "1". The second error-detecting encoding information indicates "whether or not the bitstream before encryption has been error-detecting encoded. If the second error-detecting encoding information is "1", it indicates that the bitstream before encryption has been error-detecting encoded; if the second error-detecting encoding information is "0", it indicates that the bitstream before encryption has not been error-detecting encoded. The second error-detecting encoding information is used in a decryption processor (to be described later) to compensate for the first error-detecting encoding information that has been changed in step S122. That is, a process equivalent to that for saving the original error-detecting encoding information is executed.

The second error-detecting encoding information can be recorded in a header or as a comment contained in the header. Alternatively, the second error-detecting encoding information may be appended to a predetermined position of a bitstream, and may be encrypted together with the bitstream in the next encryption process so as to be contained in the encrypted text.

In step S124, the encryption process is applied to the input bitstream. As the encryption process, all data contained in the input bitstream may be encrypted, or some of them may be partially encrypted. By partially encrypting the bitstream, access control that allows everybody to browse non-encrypted data, and only an authentic user to also browse encrypted data can be made.

In the present invention, an object to be encrypted is not particularly limited, and various data such as the aforementioned predetermined subbands, bit planes, tiles, and the like may be set as an object to be encrypted. In the present invention, the encryption process is not particularly limited, and various encryption schemes such as DES, AES, RSA, and the like can be applied.

In this embodiment, step S124 is processed after steps S121, S122, and S123. Alternatively, steps S121, S122, and S123 may be processed after step S124.

The header information and encrypted bitstream generated by the aforementioned process are output to the next code output unit 113.

The code output unit 113 receives the header information and encrypted bitstream generated by the encryption processing unit 112, and outputs them as an encrypted code stream.

As described above, according to this embodiment, when encoded image data is input and is encrypted, even when error-detecting encoding information is appended to that encoded image data, the decoding (decompressing)/decrypting side (e.g., a PC) can be avoided from erroneously recognizing that image data has an error, by removing the error-detecting encoding information.

Note that the apparatus on the decoding (decompressing)/decrypting side that receives encoded data which has been encrypted on the encrypting side cannot decompress the encoded data to normal image data (e.g., bitmap data) unless it decrypts the encrypted data. In other words, the apparatus on the decoding (decompressing)/decrypting side must acquire decryption key information using some means. In the simplest way, the decoding (decompressing)/decrypting side may request the encrypting side to send a decryption key. For example, when both these apparatuses are connected to a network such as the Internet or the like, an authentication server that manages information required to specify each image data and decryption key information may be located, and upon reception of the information required to specify the image data, corresponding decryption key information may be transmitted to the request source.

The operation in the encryption process of this embodiment has been explained. As can be easily analogized from the above description, the encryption processor of this embodiment can be implemented by an information processing apparatus such as a personal computer or the like. Since the above functions need only be implemented by the information processing apparatus such as a personal computer or the like, a characteristic feature of this embodiment covers an information processing method, a computer program, and a computer readable storage medium such as a CD-ROM that stores the computer program.

<Decryption Processor>

A decryption processor that can be applied to this embodiment will be described below using FIG. 13.

Figure 13:
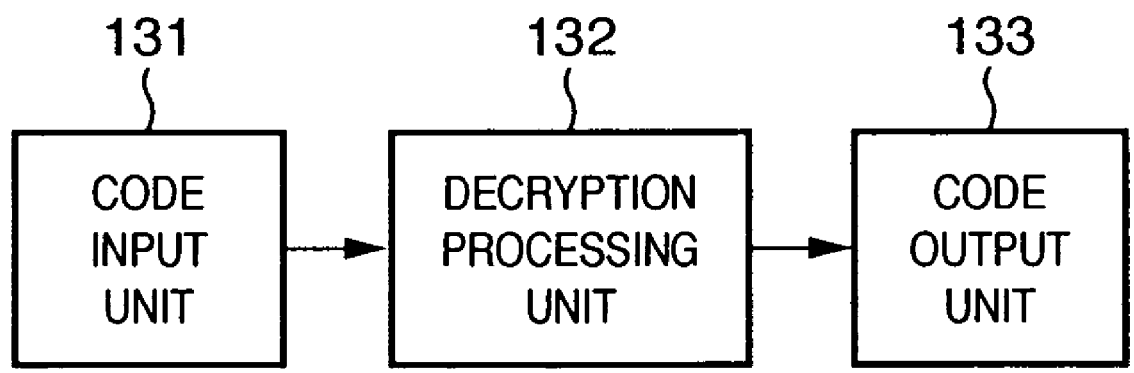
FIG. 13 is a block diagram showing the arrangement of a decryption processor in the first embodiment.

Referring to FIG. 13, reference numeral 131 denotes a code input unit; 132, a decryption processing unit; and 133, a code output unit. Assume, for the sake of easy understanding, that the code input unit 51 in the decoding (decompression) apparatus shown in FIG. 5 receives code data output from the code output unit 133.

The code input unit 131 receives a code stream, analyzes the header included in that code stream to extract parameters required for the subsequent processes, and outputs required parameters to the subsequent processing units. The bitstream contained in the code stream is output to the decryption processing unit 132.

The decryption processing unit 132 receives the bitstream, decrypts the bitstream, and outputs a decrypted bitstream.

Figure 14:
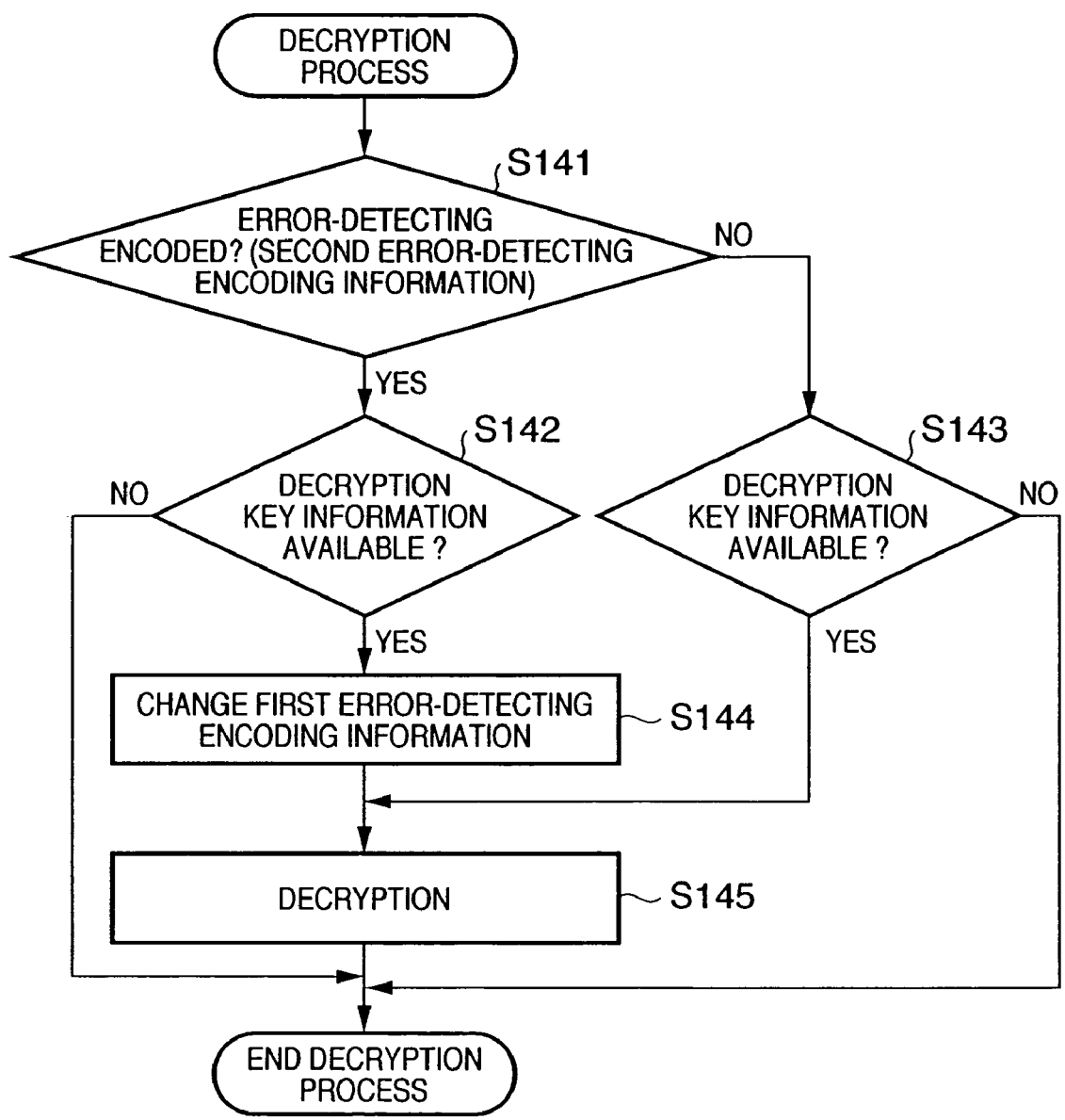
FIG. 14 is a flow chart showing a decryption process sequence in the first embodiment.

The decryption process executed by the decryption processing unit 132 will be described below using FIG. 14. FIG. 14 is a flow chart showing the decryption process that can be applied to this embodiment.

It is checked in step S141 if the input bitstream has been error-detecting encoded before encryption. This checking process can be attained using the second error-detecting encoding information contained in the header or the like, which is analyzed by the code input unit 111. If the second error-detecting encoding information is "0" (it is determined that the bitstream has not been error-detecting encoded), the flow advances to step S143 to check if decryption key information is available. If it is determined that no decryption key information is available, this process ends, and encoded data is directly output to a low-order process. If it is determined that decryption key information is available, a process for decrypting the encrypted data (decryption process), and decrypted data is output to a low-order process.

On the other hand, if it is determined in step S141 that the input bitstream has been error-detecting encoded before encryption, the flow advances to step S142 to check if decryption key information is available. If no decryption key information is available, this process ends. That is, the same process as that upon determining NO in step S143 is made.

On the other hand, if it is determined that decryption key information is available, the flow advances to step S144 to change the first error-detecting encoding information from "0" to "1". That is, the first error-detecting encoding information is changed to indicate that "error-detecting encoding is applied". This process enables the error-detecting function again in the decoding (decompression) processor by changing the first error-detecting encoding information to "1".

In step S145, a decryption process is applied to the input bitstream on the basis of the decryption key information. The decryption process must correspond to the encryption process in step S124 described above.

The header information and decrypted bitstream generated by the above process are output to the code output unit 133.

In this embodiment, the decryption process is executed after the first error-detecting encoding information is changed. However, the present invention is not limited to such specific process. For example, the first error-detecting encoding information may be changed after the decryption information is executed, as shown in FIG. 15.

Figure 15:
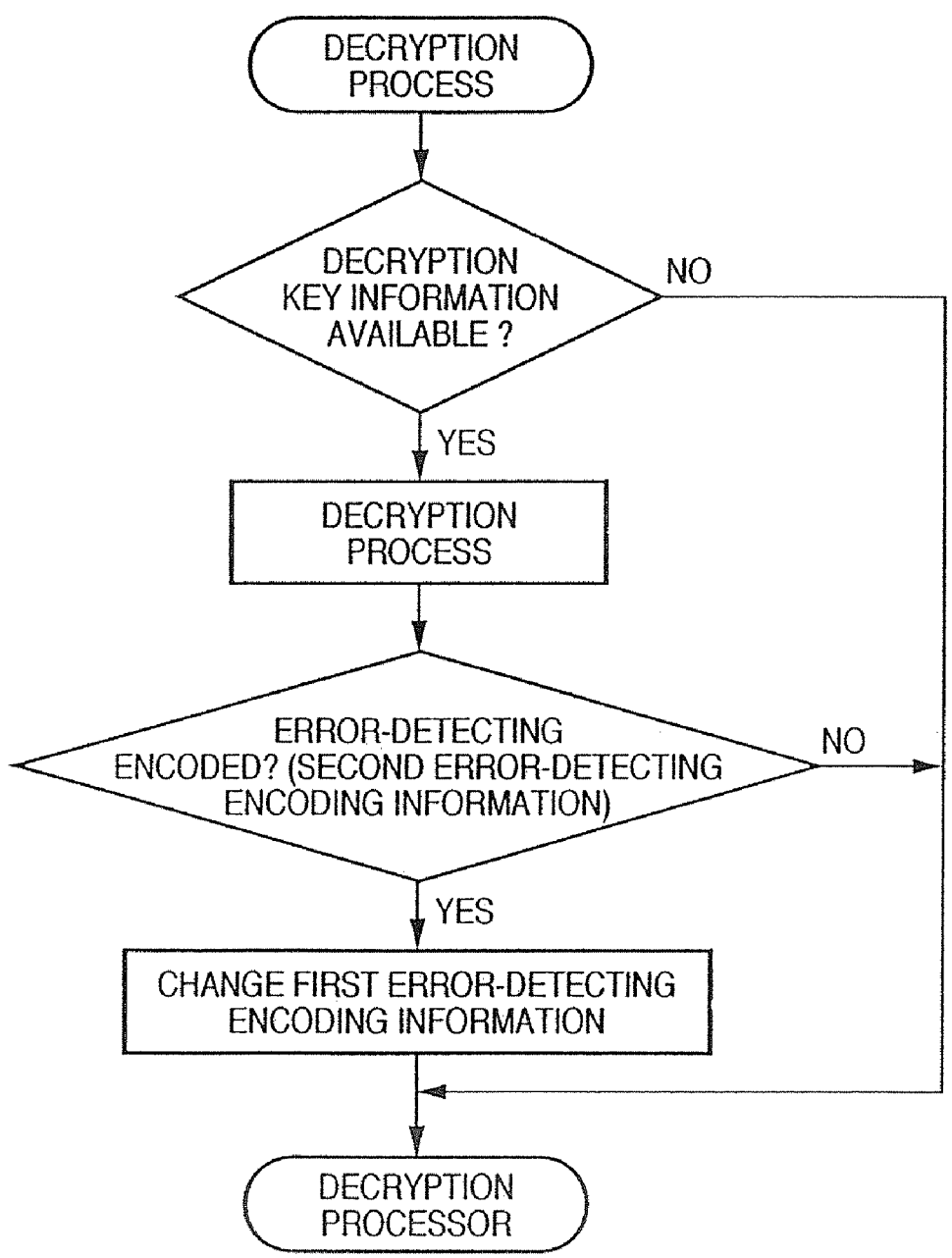
FIG. 15 is a flow chart showing another decryption process sequence in the first embodiment.

Especially, when the second error-detecting encoding information is contained in the encrypted text in the encryption processor, the decryption process must be executed according to the flow shown in FIG. 15. Since the second error-detecting encoding information is contained in the encrypted text, it is difficult to normally check the second error-detecting encoding information in the encrypted state.

The code output unit 133 receives the header information and decrypted bitstream generated by the decryption processing unit 132, and outputs them as a decrypted code stream. Note that the decryption processor may be connected to the aforementioned decoding (decompression) processor to successively execute the decoding (decompression) process.

As described above, according to this embodiment, an encrypted code stream can be prevented from being erroneously determined that it has an error, as a result of the encryption process.

More specifically, even when the encrypting apparatus appends an error-detecting code, it is apparently determined that no error-detecting encoded data is present (in practice, error-detecting encoded data is present but is ignored) upon executing the encryption process. Therefore, the decoding (decompressing)/decrypting apparatus can be prevented from erroneously determining that data has an error, and transmitting a re-send request, as long as data is normally transmitted.

When the decoding (decompressing)/decrypting apparatus has acquired decryption key information used to decrypt an encryption key, encrypted data is decrypted, and the error-detecting code is available. Hence, even when noise is mixed during data transmission, a re-send request can be issued to reclaim a normal image. The operation in the decryption processor in this embodiment has been explained.

As can be easily analogized from the above description, the decryption processor of this embodiment can be implemented by an information processing apparatus such as a personal computer or the like. Since the above functions need only be implemented by the information processing apparatus such as a personal computer or the like, a characteristic feature of this embodiment covers an information processing method, a computer program, and a computer readable storage medium such as a CD-ROM that stores the computer program.

Second Embodiment

The above embodiment (first embodiment) requires the second error-detecting encoding information indicating whether or not data has been error-detecting encoded before encryption. However, the present invention is not limited to such specific embodiment, and the need for the second error-detecting encoding information may be obviated. Hence, the second embodiment will explain a method that does not require any second error-detecting encoding information.

<Encryption Processor>

An encryption processor of this embodiment will be described first using FIG. 16.

Figure 16:
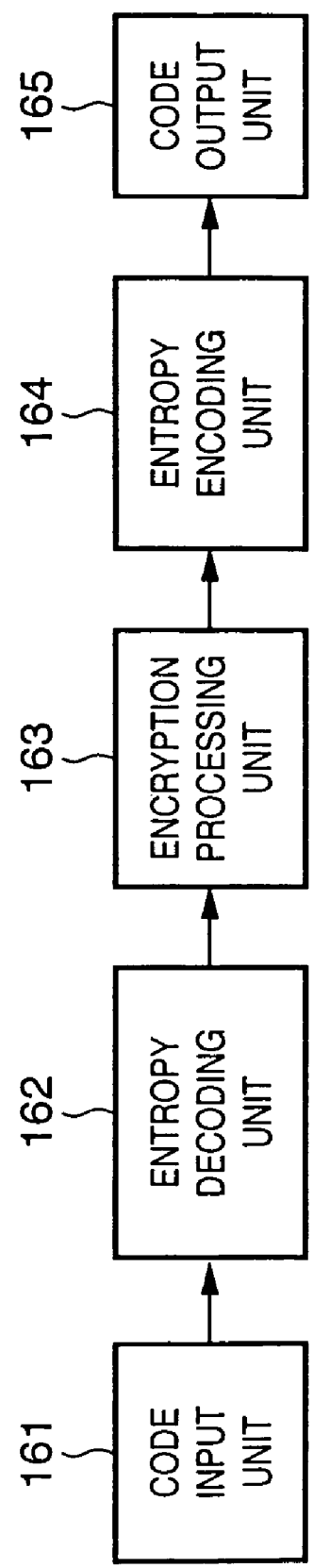
FIG. 16 is a block diagram showing the arrangement of an encryption processor in the second embodiment.

Referring to FIG. 16, reference-numeral 161 denotes a code input unit; 162, an entropy decoding (decompression) unit; 163, an encryption processing unit; 164, an entropy encoding unit; and 165, a code output unit.

Since the processes executed by the code input unit 161, entropy decoding (decompression) unit 162, entropy encoding unit 164, and code output unit 165 are equal to those executed by the code input unit 51, entropy decoding (decompression) unit 52, entropy encoding unit 14, and code output unit 15 in the first embodiment, a detailed description thereof will be omitted. Hence, details of the encryption process in the encryption processing unit 163 which executes a different process in the second embodiment will be described below.

Figure 17:
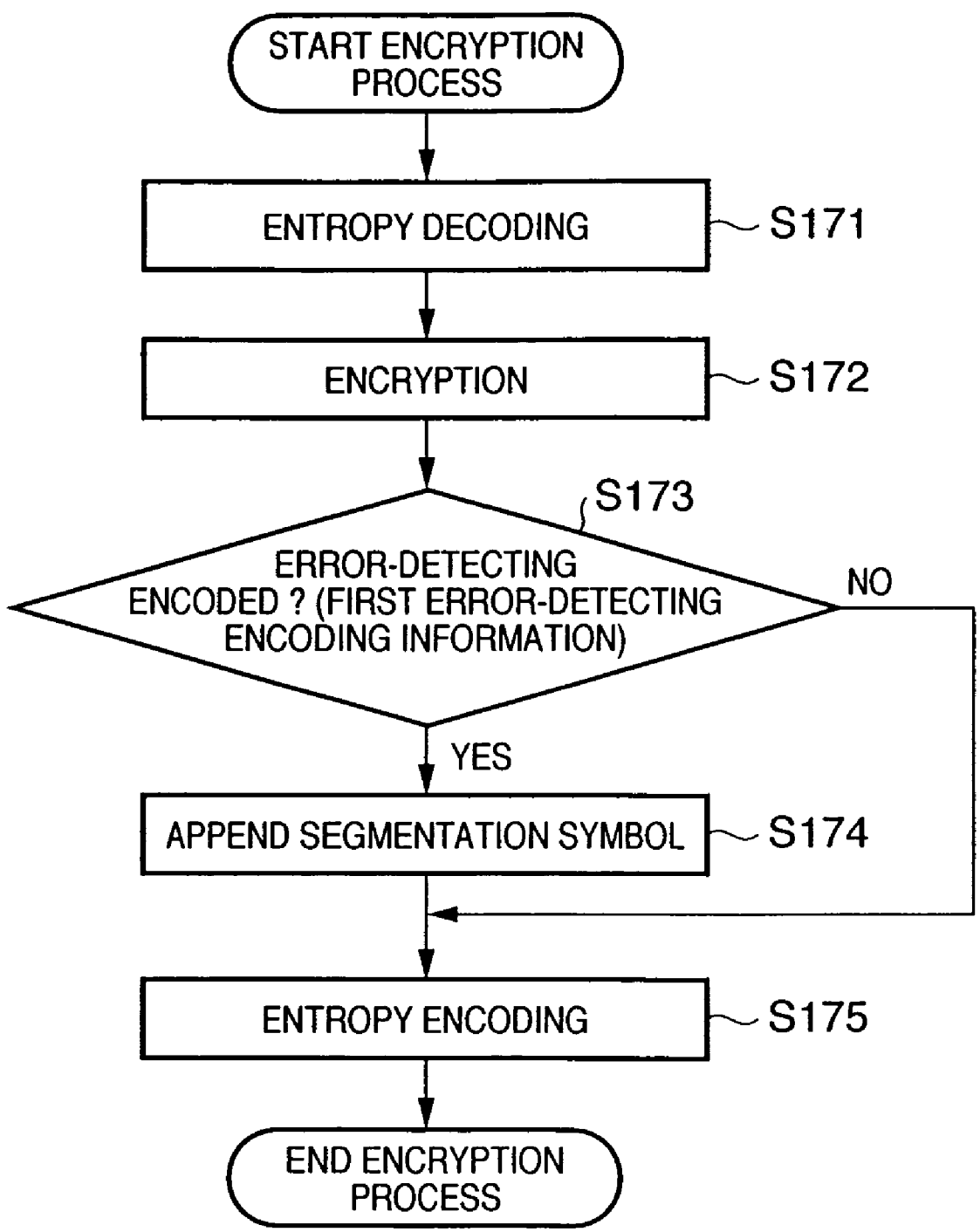
FIG. 17 is a flow chart showing an encryption process sequence in the second embodiment.

FIG. 17 is a flow chart showing the encryption process that can be applied to this embodiment.

In step S171, the aforementioned entropy decoding (decompression) process is applied for respective bit planes using the entropy decoding (decompression) unit 162. In step S172, an encryption process is executed for the entropy-decoded (decompressed) data.

It is checked in step S173 if the input bitstream has been error-detecting encoded. This checking process can be attained using the first error-detecting encoding information contained in the encoding parameter, which is analyzed by the code input unit 161. If the first error-detecting encoding information is "1" (it is determined that the bitstream has been error-detecting encoded), the flow advances to step S174; if the first error-detecting encoding information is "0" (it is determined that the bitstream has not been error-detecting encoded), the flow jumps to step S175.

In step S174, a segmentation symbol is appended after the data encrypted in step S172. In this way, the error-detecting function can be given to the encrypted data.

In step S175, the entropy encoding process is applied to the encrypted data for respective bit planes using the entropy encoding unit 164. If the segmentation symbol is appended in step S174, the entropy encoding process is applied together with the segmentation symbol.

The header information and encrypted bitstream generated by the aforementioned process are output to the next code output unit 165.

<Decryption Processor>

The process on the side of decoding (decompressing) image data in this embodiment will be described below.

Figure 18:
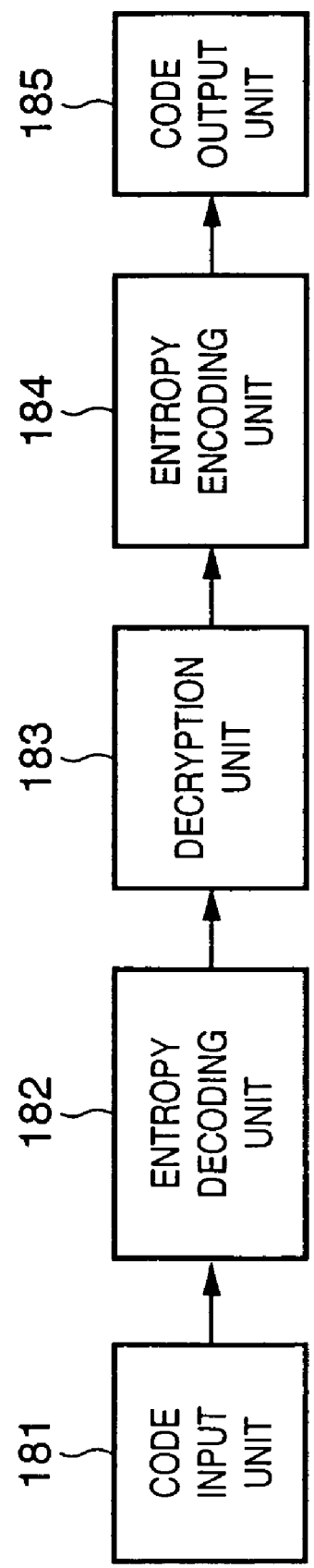
FIG. 18 is a block diagram showing the arrangement of a decryption processor in the second embodiment.

FIG. 18 is a block diagram of a decryption processor that can be applied to the second embodiment. Referring to FIG. 18, reference numeral 181 denotes a code input unit; 182, an entropy decoding (decompression) unit; 182, a decryption unit; 184, an entropy encoding unit; and 185, a code output unit. Assume, for the sake of easy understanding, that the code input unit 51 in FIG. 5 receives the code output unit 185.

Figure 19:
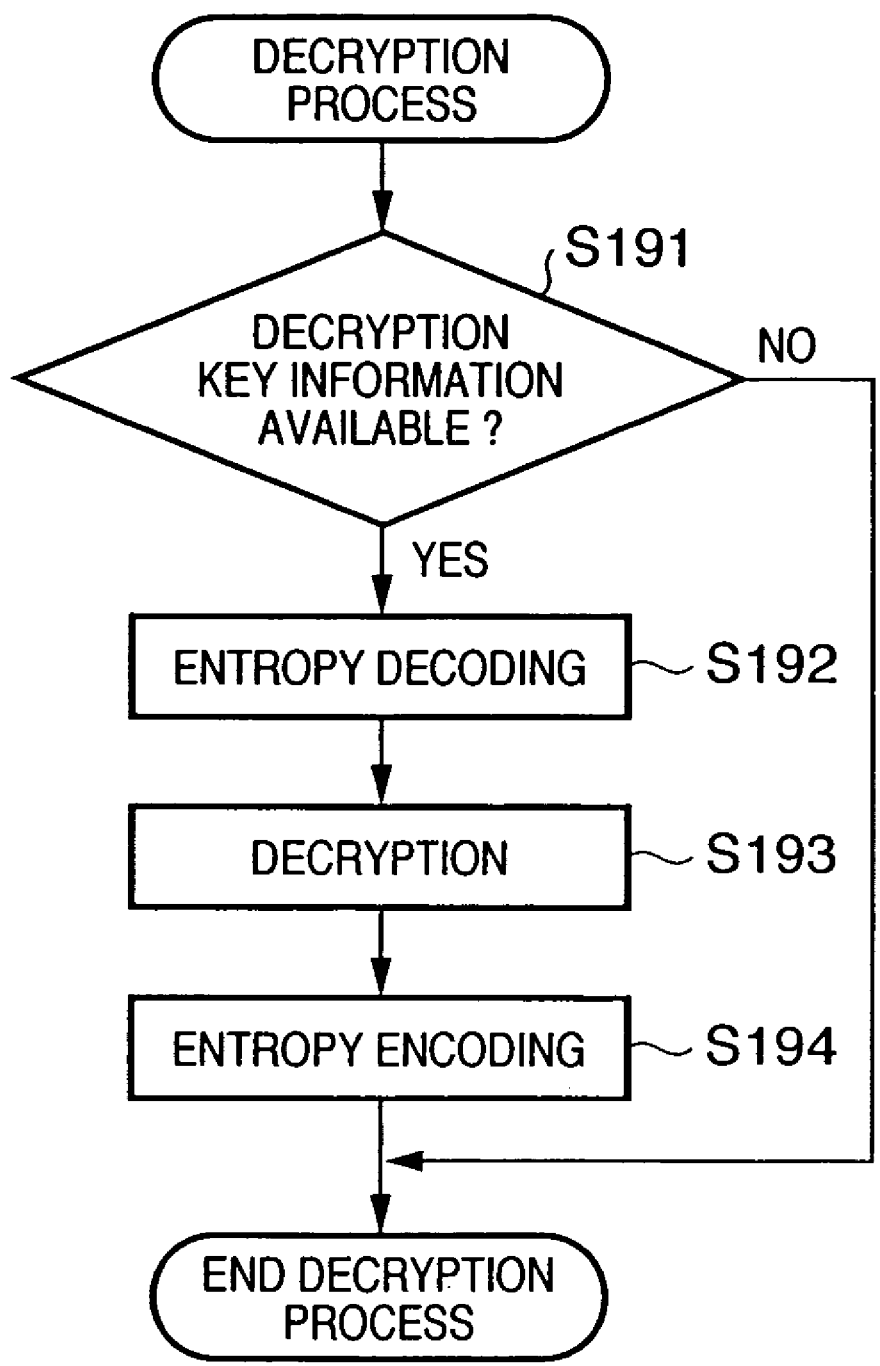
FIG. 19 is a flow chart showing a decryption process sequence in the second embodiment.

Unlike in the first embodiment (FIG. 13), the decryption unit 183, and the entropy decoding (decompression) unit 182 and entropy encoding unit 184, which are respectively connected to the input and output sides of the unit 183, are provided. Since the entropy decoding (decompression) unit 182 and entropy encoding unit 184 execute the same processes as those in the encryption apparatus, details of the decryption process in the decryption unit 183 will be described below using FIG. 19.

It is checked in step S191 if decryption key information is available. If NO in step S191, this process ends.

If decryption key information is available, the flow advances to step S192 to execute the aforementioned entropy decoding (decompression) process using the entropy decoding (decompression) unit 182. Subsequently, the decryption process is executed for the entropy-decoded (decompressed) data in step S193. The decryption process to be executed in step S193 must correspond to step S172 mentioned above. In step S194, the aforementioned entropy encoding process is executed for respective bit planes using the entropy encoding unit 184.

The header information and decrypted bitstream generated by the aforementioned process are output to the code output unit 185, which passes them to the process shown in FIG. 5.

By executing the aforementioned encryption process, the error-detecting encoding function can be given to the encrypted data.

The operations in the encryption processor and decryption processor in this embodiment have been explained. As can be easily analogized from the above description, the encryption and decryption processors of this embodiment can be implemented by an information processing apparatus such as a personal computer or the like. Since the above functions need only be implemented by the information processing apparatus such as a personal computer or the like, a characteristic feature of this embodiment covers an information processing method, a computer program, and a computer readable storage medium such as a CD-ROM that stores the computer program.

Third Embodiment

The second embodiment has exemplified a case wherein the error-detecting encoding process is executed in entropy encoding (the entropy encoding unit 14 in FIG. 1) on the assumption of JPEG2000 or the like. However, the present invention is not limited to such specific embodiment. That is, an error-detecting code may be independently appended upon encryption. Such example will be described below as the third embodiment.

<Encryption Processor>

An encryption processor (encryption apparatus) of this embodiment will be described below using FIG. 20.

Figure 20:
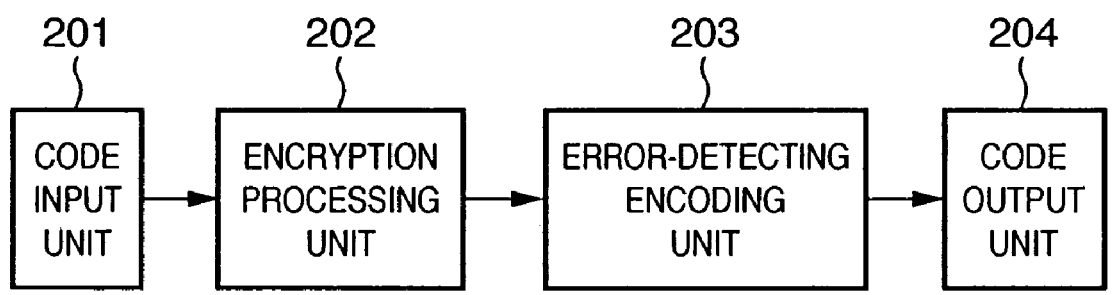
FIG. 20 is a block diagram showing the arrangement of an encryption processor in the third embodiment.

Referring to FIG. 20, reference numeral 201 denotes a code input unit; 202, an encryption processing unit; 203, an error-detecting encoding unit; and 204, a code output unit. Assume, for the sake of easy understanding, that the encoding unit 201 receives the output result of the code output unit 15 in FIG. 1. In this embodiment, however, encoded data to be input to the code input unit 201 is not limited to such specific data, but data generated by other encoding (compression) processes may be input.

Figure 21:
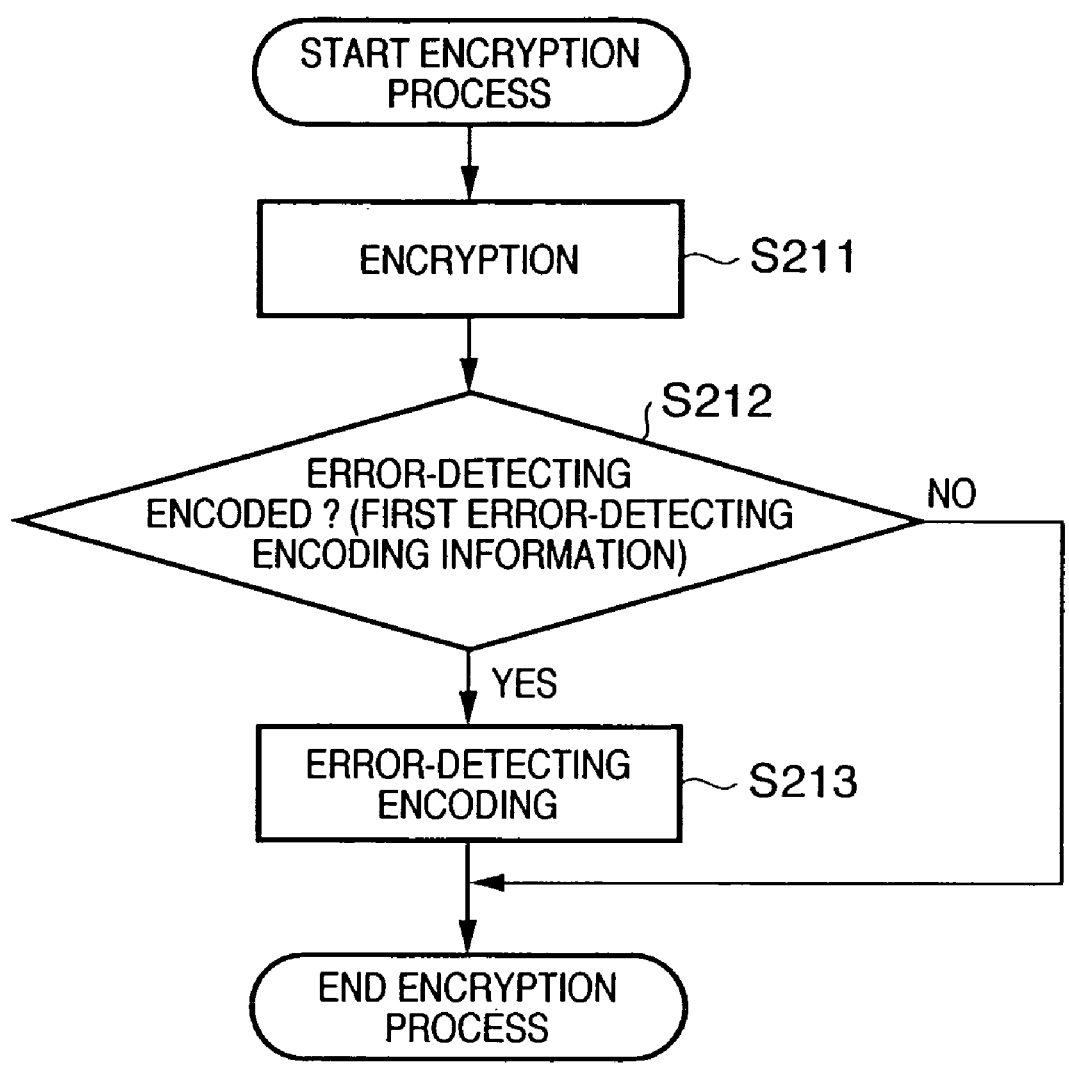
FIG. 21 is a flow chart showing the sequence of an encryption process and error-detecting encoding process in the third embodiment.

FIG. 21 is a flow chart showing an encryption process and error-detecting encoding process that can be applied to this embodiment.

In step S211, an encryption process is executed for the input bitstream using the encryption processing unit 202. Note that the input bitstream contains encoded image data, which is either appended or not appended with an error-detecting code. If input encoded data is "encoded image data+error-detecting code", the encryption process in this step encrypts together with the error-detecting code. If no error-detecting code is appended, an object to be encrypted is "encoded image data" alone, as a matter of course. Hence, if input encoded data is "encoded image data+error-detecting code", one stream which has no distinction between them is generated after encryption.

The flow advances to step S212 to check if the encrypted encoded data includes the error-detecting code. This checking process can be coped with by, e.g., referring to first-detecting encoding information described in the first and second embodiments. Also, in some cases, whether or not an error-detecting code can be detected may be determined in practice.

The reason why the "error-detecting code" is used is to improve the reliability of encoded image data. Hence, if YES in step S212, error-detecting encoding is made in step S213 to improve the reliability of transmission of the encrypted data. On the other hand, if NO in step S212, since no error-detecting encoding is made, the process in step S213 is skipped.

With the aforementioned encryption process, the error-detecting encoding function can be given to encrypted data.

The operations in the encryption processor and decryption processor in this embodiment have been explained. As can be easily seen from the above description, the encryption and decryption processors of this embodiment can be implemented by an information processing apparatus such as a personal computer or the like. Since the above functions need only be implemented by the information processing apparatus such as a personal computer or the like, a characteristic feature of this embodiment covers an information processing method, a computer program, and a computer readable storage medium such as a CD-ROM that stores the computer program.

As described above, according to the present invention, even when encoded (compressed) image data appended with an error-detecting code is encrypted, the apparatus which receives and reproduces that image data can execute a normal process without any insignificant re-send request and the like.

As many apparently widely different embodiments of the present invention can be made without departing from the spirit and scope thereof, it is to be understood that the invention is not limited to the specific embodiments thereof except as defined in the claims.

The invention claimed is:

1. An information processing method for decrypting encrypted encoded image data comprising steps of:
    receiving the encrypted encoded image data and corresponding header data, the header data including a first field storing information indicating whether the encoded image data has an error detecting code for detecting an error in the encoded image data, wherein the first field is referenced by a decoding process, and a second field storing information indicating whether the encoded image data has the error detecting code for detecting the error in the encoded image data, wherein the second field is not referenced by the decoding process;
    determining, based on the information stored in the second field, whether the encrypted encoded image data includes an error-detecting code;
    determining whether key information required to decrypt the encrypted encoded image data is available;
    modifying the first field to store information indicating that the encrypted encoded image data includes the error detecting code, if the information stored in the second field indicates that the encrypted encoded image data includes the error detecting code and the key information is available,
    wherein, if the information stored in the second field does not indicate that the encrypted encoding image data includes the error detecting code and the key information is available, the first field is not modified, and
    wherein, if the key information is not available, the first field is not modified;
    decrypting the encrypted encoded image data to generate encoded image data, if the information stored in the second field indicates that the encrypted encoded image data includes the error detecting code and the key information is available; and
    decrypting the encrypted encoded image data, if the information stored in the second field does not indicate that the encrypted encoding image data includes the error detecting code and the key information is available,
    wherein, if the key information is not available, the encrypted encoded image data is not decrypted performing all of the above steps using at least one processor.

2. The method according to claim 1, wherein the first field is included in a main header defined in the JPEG 2000 standard format and the second field is included in a comment defined in the JPEG 2000 standard format.

3. An information processing apparatus for decrypting encrypted encoded image data, the apparatus comprising:
    an input unit that receives the encrypted encoded image data and corresponding header data, the header data including a first field storing information indicating whether the encoded image data has an error detecting code for detecting an error in the encoded image data, wherein the first field is referenced by a decoding process, and a second field storing information indicating whether the encoded image data has the error detecting code for detecting the error in the encoded image data, wherein the second field is not referenced by the decoding process;
    a first determination unit that determines, based on the information stored in the second field, whether the encrypted encoded image data includes an error-detecting code;
    a second determination unit that determines whether key information required to decrypt the encrypted encoded image data is available;
    a modification unit that modifies the first field to store information indicating that the encrypted encoded image data includes the error detecting code, if the information stored in the second field indicates that the encrypted encoded image data includes the error detecting code and the key information is available,
    wherein, if the information stored in the second field does not indicate that the encrypted encoding image data includes the error detecting code and the key information is available, the first field is not modified, and
    wherein, if the key information is not available, the first field is not modified;
    a decryption unit that decrypts the encrypted encoded image data to generate encoded image data, if the information stored in the second field indicates that the encrypted encoded image data includes the error detecting code and the key information is available, and that decrypts the encrypted encoded image data, if the information stored in the second field does not indicate that the encrypted encoding image data includes the error detecting code and the key information is available, wherein, if the key information is not available, the encrypted encoded image data is not decrypted.

4. The information processing apparatus according to claim 3, wherein the first field is included in a main header defined in the JPEG 2000 standard format and the second field is included in a comment defined in the JPEG 2000 standard format.

5. A computer-readable storage medium storing a program which, when executed, performs an information processing method for decrypting encrypted encoded image data comprising steps of:

receiving the encrypted encoded image data and corresponding header data, the header data including a first field storing information indicating whether the encoded image data has an error detecting code for detecting an error in the encoded image data, wherein the first field is referenced by a decoding process, and a second field storing information indicating whether the encoded image data has the error detecting code for detecting the error in the encoded image data, wherein the second field is not referenced by the decoding process;

determining, based on the information stored in the second field, whether the encrypted encoded image data includes an error-detecting code;

determining whether key information required to decrypt the encrypted encoded image data is available;

modifying the first field to store information indicating that the encrypted encoded image data includes the error detecting code, if the information stored in the second field indicates that the encrypted encoded image data includes the error detecting code and the key information is available, wherein, if the information stored in the second field does not indicate that the encrypted encoding image data includes the error detecting code and the key information is available, the first field is not modified, and wherein, if the key information is not available, the first field is not modified;

decrypting the encrypted encoded image data to generate encoded image data, if the information stored in the second field indicates that the encrypted encoded image data includes the error detecting code and the key information is available; and decrypting the encrypted encoded image data, if the information stored in the second field does not indicate that the encrypted encoding image data includes the error detecting code and the key information is available, wherein, if the key information is not available, the encrypted encoded image data is not decrypted.

6. The computer-readable storage medium according to claim 5, wherein the first field is included in a main header defined in the JPEG 2000 standard format and the second field is included in a comment defined in the JPEG 2000 standard format.

* * * * *